(12) United States Patent
Lemieux

(10) Patent No.: US 9,363,164 B2
(45) Date of Patent: Jun. 7, 2016

(54) LOGICAL INTER-CLOUD DISPATCHER

(75) Inventor: Yves Lemieux, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 13/554,457

(22) Filed: Jul. 20, 2012

(65) Prior Publication Data

US 2014/0022951 A1    Jan. 23, 2014

(51) Int. Cl.
*H04L 12/28* (2006.01)
*H04L 12/707* (2013.01)
*H04W 40/20* (2009.01)

(52) U.S. Cl.
CPC .............. *H04L 45/22* (2013.01); *H04W 40/20* (2013.01)

(58) Field of Classification Search
None
See application file for complete search history.

(56) References Cited

U.S. PATENT DOCUMENTS

| | | | |
|---|---|---|---|
| 7,620,732 B2 | 11/2009 | Ishihara et al. | |
| 8,345,670 B1 * | 1/2013 | Xue et al. | 370/352 |
| 8,411,666 B1 * | 4/2013 | Rogers et al. | 370/351 |
| 2007/0025353 A1 * | 2/2007 | Nambisan et al. | 370/392 |
| 2007/0081460 A1 * | 4/2007 | Karacali-Akyamac et al. | 370/230 |
| 2010/0157997 A1 * | 6/2010 | Leinwand et al. | 370/389 |
| 2011/0170547 A1 * | 7/2011 | Fein | H04L 45/126 370/392 |
| 2012/0131633 A1 * | 5/2012 | Pangrac et al. | 725/119 |

FOREIGN PATENT DOCUMENTS

WO    2007008126 A1    1/2007

OTHER PUBLICATIONS

Wen-Hwa Liao et al., 2001 Kluwer Academic Publishers GRID: A Fully Location-Aware Routing Protocol for Mobile Ad Hoc Networks, pp. 37-60.*
Hannes Frey et al., Sep. 16, 2004, Elsevier—University of Trier, Germany, Planar graph routing on geographical clusters, pp. 560-573.*
Frey H et al: "Planar graph routing on geographical clusters", Ad Hoc Networks, Elsevier, Amsterdam, NL, vol. 3, No. 5, Sep. 1, 2005, pp. 560-574, XP027627613, ISSN: 1570-8705 [retrieved on Sep. 1, 2005] consisting of 16-pages.

(Continued)

*Primary Examiner* — Ian N Moore
*Assistant Examiner* — Lakeram Jangbahadur
(74) *Attorney, Agent, or Firm* — Christopher & Weisberg, P.A.

(57) ABSTRACT

Embodiments of the present invention provide a method and system for establishing a network communication path between a source node and a destination node. A destination geographic area of the destination node is determined. An intermediate node located in an intermediate geographic area that is adjacent to a source geographic area of the source node and is in a direction that is toward the destination geographic area is determined based at least in part on the destination geographic area. Connectivity with the intermediate node is requested or established. A determination is made as to whether the adjacent intermediate geographic area is the destination geographic area. If the determined adjacent intermediate geographic area is not the destination geographic area, a next intermediate node in another intermediate geographic area that is adjacent to the intermediate geographic area and is in a direction that is toward the destination geographic area is determined.

16 Claims, 8 Drawing Sheets

(56) References Cited

OTHER PUBLICATIONS

Liao et al.: "GRID: A fully location-aware routing protocol for mobile ad hoc networks", Telecommunication Systems, vol. 18, No. 1/3, Jan. 1, 2001, pp. 37-60, XP055064389, ISSN: 1018-4864, DOI: 10.1023/A:1016735301732 DOI: http://dx.doi.org/10.1023/A:1016735301732 consisting of 24-pages.

International Search Report and Written Opinion dated Dec. 17, 2013 for International Application No. PCT/IB2013/055684, International Filing Date Jul. 11, 2013 consisting of 14 pages.

Cloud Security Alliance (CSA), "Top Threats to CC", V1.0, dated Mar. 2010 consisting of 14-pages.

Bilel Jamoussi, Ph.d., Chief Study Groups Telecommunication Standardization Bureau, Geneva, Switzerland, ITU-T Focus Group on CC, FTRA 2011, Kigali Rwanda dated Jun. 13, 2011 consisting of 36-pages.

TM-Forum Insights Research Publication, "Seeing through the Clouds", quick Insights Report consisting of 22-pages.

* cited by examiner

LOGICAL INTER-CLOUD DISPATCHER

TECHNICAL FIELD

The present invention relates to network communications, and in particular to finding a path and establishing a connection to a destination node through a communication network.

BACKGROUND

Routing is the process of selecting network communication paths in a network for transmitting data packets using Open System Interconnection ("OSI") layer three. Routing directs packet forwarding from a source node to a destination node through one or more intermediate nodes. Intermediate nodes may include computers, routers, bridges, gateways, and switches. The routing process relies on routing tables that maintain a record of routes to various network destinations. Thus, maintaining routing tables that have the correct routing information is pivotal for efficient routing.

Routing tables typically include a variety of information, such as the addresses of local sub-networks, port identifiers, addresses of adjacent nodes, static routes, and dynamically learned routes, among other routing information. The routing information is used to determine a particular intermediate node representing the next hop on the path to the final destination node. Each intermediate node that receives the packet checks the destination address of the packet, looks up routing information in the routing table, determines a next hop using the information in the routing table and determines which port to use to forward the data packet to the next hop.

Hence, if hundreds of intermediate nodes are used to transmit a packet from a source to a destination, then hundreds of routing tables have to be consulted. It takes time for a routing algorithm to look-up information in a routing table and to determine an optimal route to the destination node. Each time a routing algorithm for an intermediate node performs these operations, a delay in the transmission of the packet occurs. Additionally, these delays increase depending on the number of metrics used to determine the optimal path to the destination node, such as bandwidth requirements, path cost, load, reliability, hop count, etc.

Moreover, routing tables have to be constantly updated, as when one of the nodes is experiencing a failure, the nodes that used that node as their next hop will have to discard those entries from the routing table, and create new routing information. The newly created information is then passed to all adjacent nodes, which then repeat the process and pass the information to their corresponding adjacent nodes. Eventually all the nodes in the network receive the updated information and proceed to discover new paths to the destination node that do not include the failed node. For a network with N routers, a fully meshed network topology update can generate on the order of $N^2$ (squared) calculations. This phenomenon, referred to as the N-squared problem, severely degrades network performance and scalability. By way of example, establishing dedicated connections between 20 nodes requires 400 connections, which takes a significant amount of computation time.

Currently, cloud-based wide area network provisioning encompasses establishing and provisioning as many broadband links on a peer-to-peer basis as there are cloud accesses between a tenant and cloud servers. This generates an N-squared problem due to the full-meshing between tenants to multiple clouds which is expensive and slow to establish, producing higher costs, reduced scalability and higher time to market ("TTM").

SUMMARY

The present invention advantageously provides a method and system for establishing a network communication path. In accordance with one aspect, a method for establishing a network communication path in a communication network between a source node and a destination node, is provided. The communication network has multiple substantially equal area geographic areas. A destination geographic area of the destination node is determined. An intermediate node located in an intermediate geographic area that is adjacent to a source geographic area of the source node and is in a direction that is toward the destination geographic area is determined based at least in part on the destination geographic area. Connectivity with the intermediate node is established. A determination is made as to whether the adjacent intermediate geographic area is the destination geographic area. If the determined adjacent intermediate geographic area is not the destination geographic area, the intermediate node is established as a current intermediate node, a next intermediate node located in an intermediate geographic area that is adjacent to the intermediate geographic area of the current intermediate node and is in a direction that is toward the destination geographic area is determined. Connectivity with the next intermediate node is established. The steps are repeated until the determined adjacent intermediate geographic area is the destination geographic area to establish the network communication path.

According to another aspect, a source dispatcher for communication with a source node is provided. The source dispatcher is arranged to establish a network communication path in a communication network between the source node and a destination node. The communication network has multiple substantially equal area geographic areas. The source dispatcher includes a receiver and a processor in communication with the receiver. The receiver is configured to receive a request from the source node to connect to the destination node. The processor is configured to determine a destination geographic area of the destination node. The processor determines, based at least in part on the destination geographic area, an intermediate node located in an intermediate geographic area that is adjacent to a source geographic area of the source node and is in a direction that is toward the destination geographic area. The processor establishes connectivity with the intermediate node.

In accordance with yet another aspect, a source node is provided. The source node is configured to establish a network communication path in a communication network between the source node and a destination node. The communication network has multiple substantially equal area geographic areas. The source node includes a processor configured to determine a destination geographic area of the destination node. The processor determines, based at least in part on the destination geographic area, an intermediate node located in an intermediate geographic area that is adjacent to a source geographic area of the source node and is in a direction that is toward the destination geographic area. The processor establishes connectivity with the intermediate node.

In accordance with still another aspect a method for establishing a network communication path in a communication network between a source node and a destination node is provided in which the communication network has a plurality of substantially equal area geographic areas. A destination geographic area of the destination node is determined. A determination is made, based at least in part on the destination geographic area, of an intermediate node located in an intermediate geographic area that is adjacent to a source geographic area of the source node and is in a direction that is toward the destination geographic area. A determination is made whether the adjacent intermediate geographic area is the destination geographic area. If the determined adjacent intermediate geographic area is not the destination geographic area, (1) the intermediate node is established as a current intermediate node and (2) a next intermediate node located in an intermediate geographic area that is adjacent to the geographic area of the current intermediate node and is in a direction that is toward the destination geographic area is determined. Steps (1) and (2) are repeated until the determined adjacent intermediate geographic area is the destination geographic area to determine the network communication path. Communication is established from the source node and the destination node using the determined network path.

DETAILED DESCRIPTION

Figure 1:
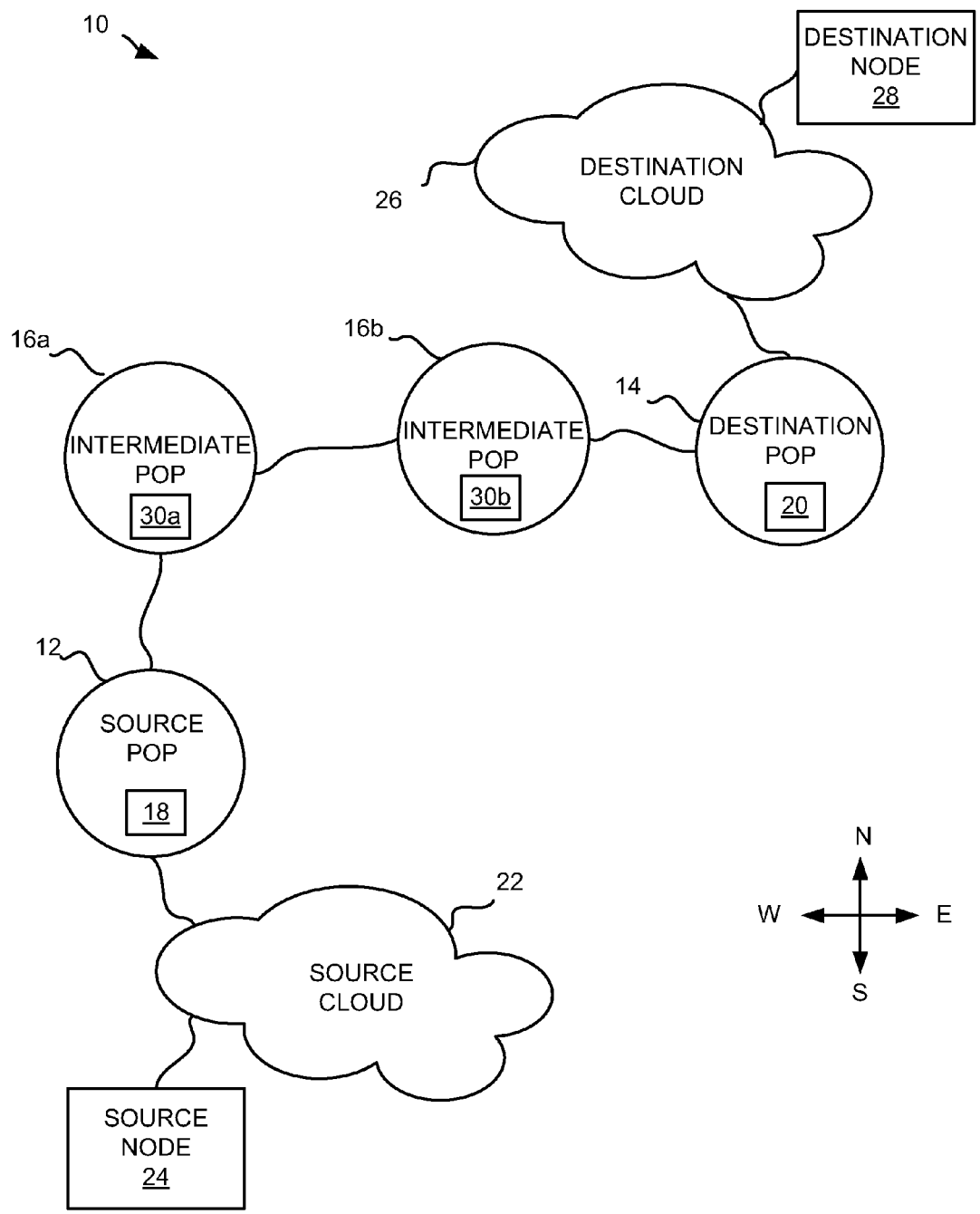
FIG. 1 is a diagram of an exemplary system for establishing a network path between a source node and a destination node in accordance with the principles of the present invention.

Embodiments of the present invention provide a method and system for establishing a network communication path between a source node and a destination node. In accordance with an embodiment, a geographic location of a destination node is determined. A source node determines, based at least in part on a destination geographic area where a destination node is located, an intermediate node located in an intermediate geographic area that is adjacent to a source geographic area and is in a direction that is toward the destination geographic area. The source node connects to the intermediate node.

Before describing in detail exemplary embodiments that are in accordance with the present invention, it is noted that the embodiments reside primarily in combinations of apparatus components and processing steps related to implementing a method, a system and a dispatcher for establishing a network communication path between a source node and a destination node. Accordingly, the method, system, and dispatcher device components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which reference designators refer to like elements, there is shown in FIG. 1 a diagram of an exemplary system constructed in accordance with the principles of the present invention and designated generally as "10". System 10 includes source point of presence ("POP") node 12, destination POP node 14 and intermediate POP nodes 16a and 16b (collectively referred to as intermediate POP node 16). Source dispatcher 18 is associated with source POP node 12. Source POP node 12 is in communication with source node 24 in source cloud 22. Source node 24 is a tenant of source cloud 22. Intermediate POP node 16a is associated with intermediate dispatcher 30a and intermediate POP node 16b is associated with intermediate dispatcher 30b. Destination dispatcher 20 is associated with destination POP node 14. Destination POP node 14 is in communication with destination node 28 in destination cloud 26.

In an exemplary embodiment, a network communication path in a communication network between source node 24 and destination node 28 is established. The communication network includes many substantially equal area geographic areas. Source node 24 sends to source dispatcher 18 a request to connect to destination node 28 via destination POP node 14. Source dispatcher 18 may determine a destination geographic area of destination POP node 14. Source dispatcher 18 may determine, based at least in part on the destination geographic area, an intermediate node 16a located in an intermediate geographic area that is adjacent to a source geographic area of source POP node 12 and is in a direction that is toward the destination geographic area. Source dispatcher 18 may establish connectivity with intermediate dispatcher 30a in intermediate node 16a.

Intermediate dispatcher 30a determines whether the adjacent intermediate geographic area where intermediate node 16a is located in the destination geographic area. If the determined adjacent intermediate geographic area is not the destination geographic area, intermediate dispatcher 30a establishes intermediate node 16a as a current intermediate node. Intermediate dispatcher 30a determines a next intermediate node 16b located in an intermediate geographic area that is adjacent to the intermediate geographic area of the current intermediate node 16a and is in a direction that is toward the destination geographic area. Intermediate dispatcher 30a establishes connectivity with intermediate dispatcher 30b associated with intermediate node 16b. The present embodiment is described with reference to establishing connectivity on a node by node basis, as each next node is determined. However, the invention is not limited to such. It is contemplated that the establishment of an actual connection may either be done at this time or after all intermediate nodes 16 on the path to destination POP node 14 have been identified, i.e., after the path from source node 24 to destination node 28 has been established.

Intermediate dispatcher 30b determines whether the intermediate geographic area where intermediate node 16b is located is the destination geographic area. If the determined adjacent intermediate geographic area is not the destination geographic area, intermediate dispatcher 30b establishes intermediate node 16b as a current intermediate node. Intermediate dispatcher 30b determines that the destination geographic area is adjacent to the intermediate geographic area of the current intermediate node 16b. Intermediate dispatcher 30b connects to destination dispatcher 20 associated with destination POP node 14. Destination POP node 14 and source POP node 12 finally establish bidirectional communication and destination POP node 14 provides access to destination node 28 in destination cloud 26. Although FIG. 1 shows a particular number of POP nodes, clouds, etc., the invention is not limited to such. Any number of nodes and clouds may be used.

Figure 2:
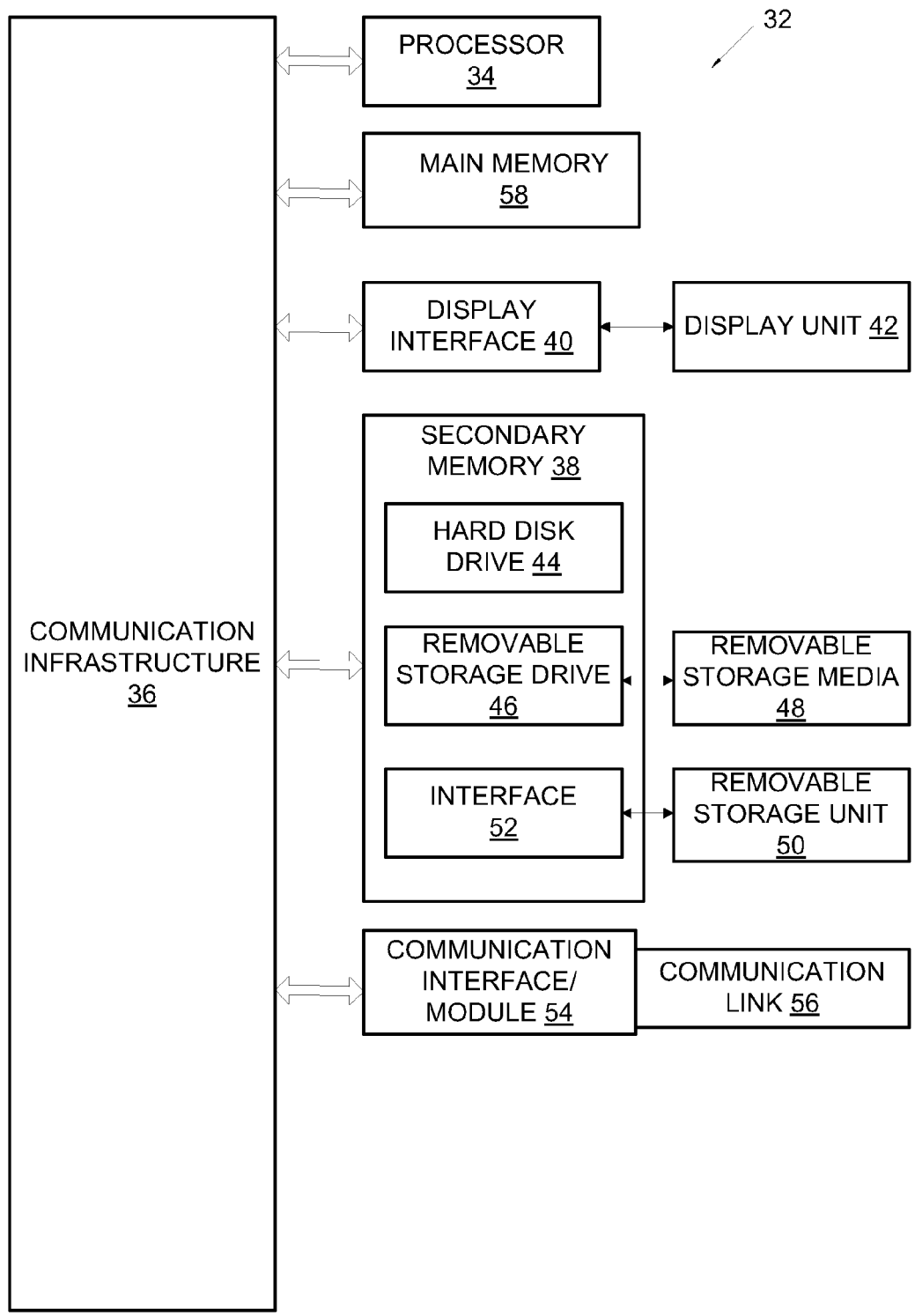
FIG. 2 is a block diagram of an exemplary node constructed in accordance with the principles of the present invention.

FIG. 2 is a block diagram of an exemplary node 32. Source POP node 12, destination POP node 14, intermediate POP node 16a, intermediate POP node 16b, source node 24 and destination node 28 may be implemented using node 32. Similarly, source dispatcher 18, intermediate dispatcher 30a, intermediate dispatcher 30b and destination dispatcher 20 may be implemented using the hardware and software of node 32. Node 32 may be a POP node or a POP dispatcher that acts as an access point for one network to connect to another network.

Node 32 includes one or more processors, such as processor 34 programmed to perform the functions described herein. Processor 34 is operatively coupled to a communication infrastructure 36. Node 32 may include secondary memory 38, display interface 40, display unit 42, and main memory 58. Secondary memory 38 may include, for example, a hard disk drive 44 and/or a removable storage drive 46 that reads from and/or writes to a removable storage media 48. In alternative embodiments, secondary memory 38 may include a removable storage unit 50 and an interface 52 which allows software and data to be transferred from the removable storage unit 50 to other devices.

Node 32 may also include a communications interface/module 54. Examples of communications interface 54 may include a modem, a network interface (such as an Ethernet card), a communications port, a PCMCIA slot and card, wireless transceiver/antenna, a transmitter, a receiver, etc. Software and data transferred via communications interface/module 54 may be, for example, electronic, electromagnetic, optical, or other signals. These signals are provided to communications interface 54 via the communications link (i.e., channel) 56. Link 56 carries signals and may be implemented using wire or cable, fiber optics, a phone line, a cellular phone link, an RF link, and/or other communications channels. Computer programs are stored in main memory 58 and/or secondary memory 38.

Node 32 functionality may be performed by a single computing device or distributed among multiple computing devices. Node 32 functionality may also be performed by one or more virtual computers. Various software embodiments are described in terms of this exemplary computer system. It is understood that computer systems, software, and/or computer architectures other than those specifically described herein can be used to implement the invention. It is also understood that the capacities and quantities of the components of the architecture described may vary depending on the node or device, the quantity of devices to be supported, as well as the intended interaction with the device.

In an exemplary embodiment, node 32 is configured to perform the functions of a logical inter-cloud dispatcher. The dispatcher may be implemented in hardware, software or a combination of hardware and software. The dispatcher may include logic to receive and process cloud requests. For example, the dispatcher may determine which cloud services are available, as well as determine a geographic location of node 32, e.g., source POP node 12, source cloud 22, source node 24, source dispatcher 18, destination POP node 14, destination cloud 26, destination node 28, destination dispatcher 20, intermediate POP node 16a, intermediate POP node 16b and intermediate dispatchers 30a and 30b. Node 32 may be implemented as a dispatcher associated with, for example, source POP node 12.

Node 32 can allow other nodes to establish a connection to a communication network. Node 32 may be a virtual POP node implemented in software or may be a physical POP node device, such as, a computer, a telecommunication device, a server, router, a modem, and a switch, among other devices. Alternatively, node 32 may be implemented using a combination of hardware and software. Network nodes, such as source node 24, source POP node 12, source dispatcher 18, intermediate POP node 16a, intermediate dispatcher 30a, intermediate POP node 16b, intermediate dispatcher 30b, destination POP node 14, destination dispatcher 20 and destination node 28, may communicate among each other using a communication network. The communication network may include an optical network, a cellular communication network, the Public Switched Telephone Network ("PSTN"), or other wide area network ("WAN"), such as the Internet, as well as local area networks ("LANs"), such as an Ethernet LAN. The communication network may be a wireless network, such as Wi-Fi, satellite, infrared, Bluetooth, Near Field Communications, or other communication network. Each node may be connected via the communication network to other computers or nodes (not shown).

Establishing connectivity for a POP node 32 may be based at least in part on a geographic location of a geographic area where POP node 32 is located. A grid may be used to divide the territory of the communication network into a series of contiguous geographic areas, which can be assigned unique identifiers. Any type and shape of grid may be used, such as a grid that defines square, rectangular, triangular, hexagonal and diamond-shaped areas, among others. A geodesic grid may be used to model the surface of the Earth using subdivided polyhedrons, e.g., icosahedrons.

The grid lines may define a coordinate system that creates and defines the multiple geographic areas created. The grid lines may be numbered, sequentially from an origin, or may be identified using identifications going east to west and north to south. The grid lines make it possible to identify each geographic area of the multiple areas of the territory or the communication network and determine a direction of travel from one geographic area to a different geographic area. The grid lines may identify a location of one geographic area in relation to a location of another geographic area so that a direction of travel from one geographic area to another geographic area may be determined. For instance, a first geographic area may be located in a west direction relative to a location of a second geographic area. Travelling toward the first geographic area includes going west from the second geographic area.

A grid reference may pinpoint a unique geographic area of the multiple geographic areas. Grid spacing may be arbitrary or may be based on specific predetermined distances, for example, a grid may use a 1000 km square grid spacing. A grid may be used to define multiple geographic areas with approximately the same surface area. The multiple geographic areas may have similar shapes and measurements. A grid that defines overlapping geographic areas may also be used. The resolution or granularity of the grid may vary, thus the multiple geographic areas or cells created may have different areas. The geographic granularity of the grid defines the intermediate geographic area.

In another exemplary embodiment, a territory, such as the Earth, may be divided in multiple geographic areas or segments, including the source geographic area, destination geographic area and many intermediate geographic areas. Any number of lines parallel to the Equator and lines parallel to the Prime Meridian may be used to create a grid for segmenting a territory, e.g., the Earth, into geographic areas. For example, a communication network connecting nodes around the globe may cover all or part of the Earth's territory. A global grid may define a mesh that covers the entire surface of the Earth. Each geographic area of a communication network covering the Earth may be identified in many different ways, including using the standard, geographic coordinates of latitude and longitude.

An adjacent intermediate geographic area may be any geographic area inside a virtual square created using as a first border a longitude of the source geographic area, as a second border a longitude of the destination geographic area, as a third border a latitude of the destination geographic area and as a fourth border a latitude of the source geographic area. An adjacent/intermediate geographic area may have a longitude that is either (i) equal to the longitude of a source geographic area or equal to the longitude of a destination geographic area, or (ii) in between the longitude of the source geographic area and the destination geographic area. The adjacent geographic area can further have a latitude that is either (i) equal to the latitude of a source geographic area or equal to a latitude of the destination geographic area, or (ii) in between the latitude of the source geographic area and the latitude of the destination geographic area.

In another exemplary embodiment, the territory of the communication network may be segmented in multiple geographic areas that may have the shape of a square with measurements of approximately 1000 km length and 1000 km width. For instance, since the Earth has a circumference of about 40,000 km, the circumference of the Earth may be divided using a grid having forty divisions/segments/areas. A grid may include a first set of divisors, such as a first set of lines that are parallel to the Equator, to divide the Earth's territory, i.e., the territory of a communication network, horizontally. A grid may further include a second set of divisors, such as a second set of lines that are perpendicular to the first set of lines, to divide the territory of a communication network vertically. For instance, a grid may use the Prime Meridian as a base to divide the Earth vertically, creating twenty geographic areas below the Equator line and twenty geographic areas above the Equator line.

Each geographic area has a geographic area identification, which may be based on the latitude and longitude coordinates of the geographic area. A geographic area may be referred to as a pinning-square given that, upon installation of a new POP node, the new POP node is automatically pinned into an appropriate 1000 km×1000 km geographic area based on the geographic location, e.g., latitude and longitude, of the new POP node. Additionally, geographic areas may be uniquely identified with a value, which may be a positive value or a negative value, as used in Cartesian coordinate systems.

Determining a Network Communication Path based on Directions of Travel to a Destination Node In another exemplary embodiment, a source, i.e., a node in a source geographic area, determines a communication path between the source and a destination, i.e., another node, located in a destination geographic area. The source geographic area is an area where a source, such as source POP node 12, source cloud 22, source dispatcher 18 or source node 24, is located. The destination geographic area is the area where a destination, such as destination POP node 14, destination node 28, destination dispatcher 20 or destination cloud 26, is located. A direction of travel to the destination geographic area may include at least one of two directions, a first direction and a second direction, from the source geographic area where the second direction is perpendicular/orthogonal to the first direction of travel.

A source determines a geographic location of a destination geographic area in relation to a geographic location of a source geographic area. A source determines at least one of a first direction and a second direction of travel from a source geographic area toward a destination geographic area. A source determines an intermediate geographic area based at least in part on a first direction and a second direction. The determined intermediate geographic area is in a direction toward the destination geographic area, i.e., is in at least one of the first direction and the second direction. As such, the determined intermediate geographic area is geographically closer to the destination geographic area than the source geographic area. An intermediate geographic area is an area where an intermediate POP node 16 is located and may be adjacent to the source geographic area. The intermediate POP nodes may be configured to support a service level agreement as required by source node 24. During the last iteration while trying to find a network communication path between a source and a destination, the last intermediate geographic area determined may be the destination geographic area.

A source determines that the destination geographic area is in at least one of a first direction and a second direction of/from the source geographic area. The first direction may be one of a north direction and a south direction, and the second direction may be one of an east direction and a west direction. To determine a path to the destination geographic area, the source determines an intermediate geographic area that meets the following requirements: (i) is geographically located in at least one of the first direction and the second direction from the current geographic area, in this case, the source geographic area, and (ii) is located within a predetermined distance of the source geographic area, such as located in an adjacent intermediate geographic area.

By way of example, the destination geographic area may be geographically located in a north east direction from the source geographic area. As such, the destination geographic area is located in a first direction north of the source geographic area, and in a second direction east of the source geographic area, i.e., the first direction is north and the second direction is east. The source determines whether the destination geographic area is geographically located within a predetermined distance of the source geographic area, e.g., the destination geographic area is adjacent to the source geographic area. If so, the source connects to the destination in the destination geographic area. Else, if the destination geographic area is further than a predetermined distance from the source geographic area, the source proceeds to determine a first intermediate geographic area that meets the requirements. The source determines that a first intermediate geographic area is north of the source geographic area and within a predetermined distance of the source geographic area. The source connects to intermediate POP node 16a in the first intermediate geographic area.

Intermediate POP node 16a determines, based at least in part on the location of the destination geographic area relative to the location of the first intermediate geographic area, at least one of a first direction and a second direction of travel from the first intermediate geographic area toward the destination geographic area. In this example, the destination geographic area where destination POP node 14 is located is east of the first intermediate geographic area where intermediate POP node 16a is located. As such, the first direction of travel from the first intermediate geographic area toward the destination geographic area is east, and there is no second direction, given that the destination geographic area is not south or north of the first intermediate geographic area, but it is at the same latitude as the first intermediate geographic area. Intermediate POP node 16a determines a second intermediate geographic area that meets the requirements.

Intermediate POP node 16a determines that a second intermediate geographic area is geographically located in a first direction of travel toward the destination, i.e., is in a first direction east of the first intermediate geographic area. As such, the second intermediate geographic area is in at least one of the determined first direction and second direction of the first intermediate geographic area. Intermediate POP node 16a connects to intermediate POP node 16b in the second intermediate geographic area.

Intermediate POP node 16b determines whether it is the destination. If so, the destination has been reached. Else, intermediate POP node 16b determines whether the destination geographic area is within a predetermined distance of the second intermediate geographic area. If the destination geographic area is within a predetermined distance, then intermediate POP node 16b establishes a connection with the destination located in the destination geographic area. Else, intermediate POP node 16b determines a location of the destination with respect to the second intermediate geographic area, i.e., with respect to the area where intermediate node 16b is located. In this example, the destination geographic area is within a predetermined distance of the second intermediate geographic area. As a result, intermediate POP node 16b proceeds to establish a connection with the destination in the destination geographic area.

Figure 3:
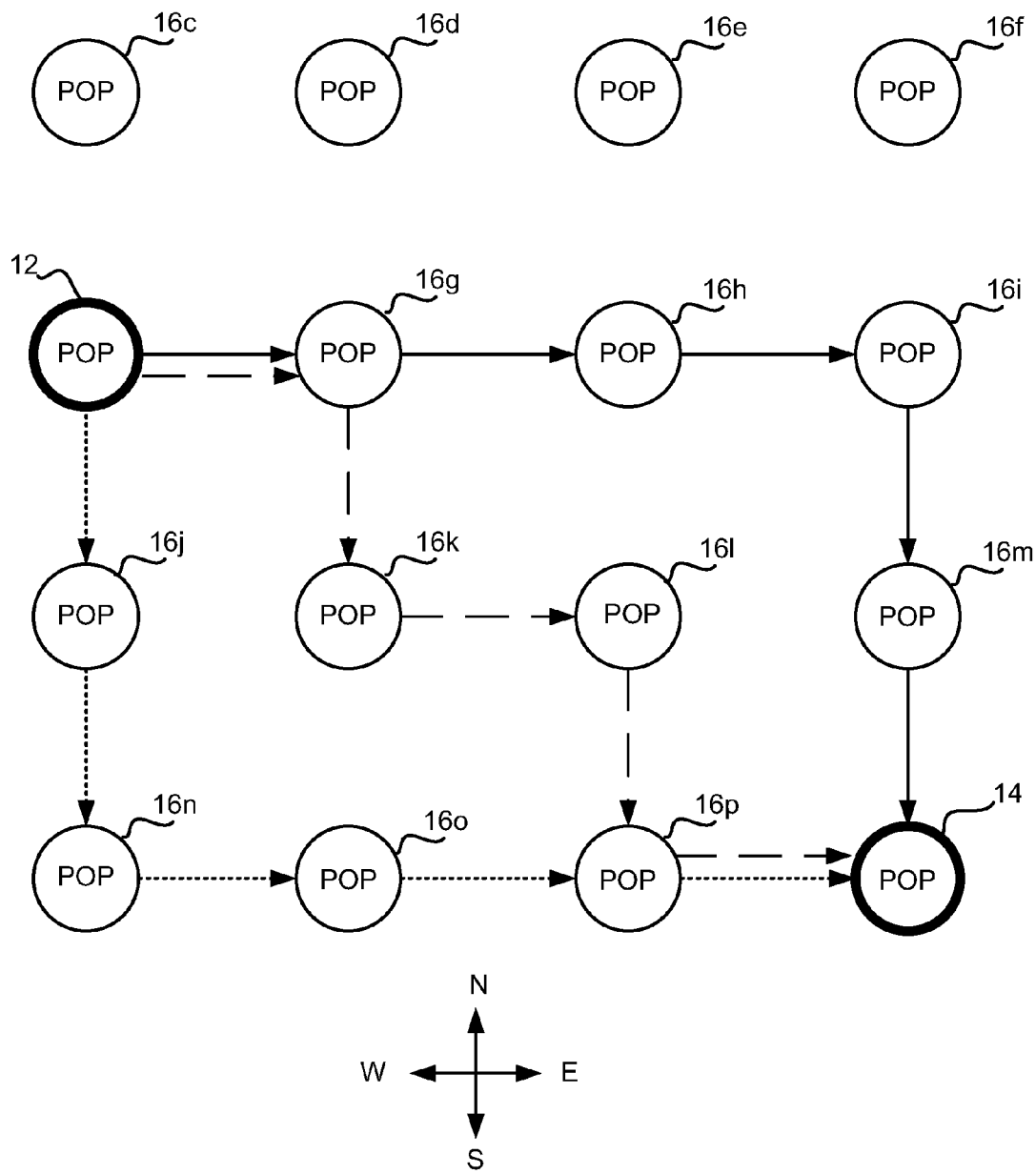
FIG. 3 is a block diagram of exemplary network communication paths from a source node to a destination node in accordance with the principles of the present invention.

FIG. 3 is a block diagram of different network connectivity paths from exemplary source POP node 12 to exemplary destination POP node 14 through one or more exemplary intermediate POP nodes 16c, 16d, 16e, 16f, 16g, 16h, 16i, 16j, 16k, 16l, 16m, 16n, 16o and 16p (generally referred to as intermediate POP nodes 16). More or fewer intermediate POP nodes 16 may be used in establishing a path between source POP node 12 and destination POP node 14. The invention is not limited to a particular number of intermediate POP nodes 16. Additionally, the geographic location and orientation of each POP node in FIG. 3 is exemplary, as POP nodes may be located at any distance or orientation from each other. POP nodes may connect to other POP nodes in any direction, such as a north, south, east, west, northeast, northwest, southeast or southwest direction.

Source POP node 12, located in a source geographic area, is in communication with a tenant node, i.e., source node 24. Destination POP node 14, located in a destination geographic area, is in communication with a specific cloud, i.e., destination cloud 26. A tenant, such as an organization, may make a request via a cloud manager of source cloud 22 to reserve resources on destination cloud 26. Source dispatcher 18 associated with source POP node 12 sends a connection request to destination dispatcher 20 associated with destination POP node 14. Source dispatcher 18 sends the request to destination dispatcher 20 via a communication network using level three routing. The communication network may be the Internet.

Destination dispatcher 20 receives the request and, in response to the request, sends geographic location information to source dispatcher 18. Geographic location information may include geographic location information associated with, for example, destination cloud 26, destination node 28, destination dispatcher 20 and/or destination POP node 14. The location information may include location coordinates of destination POP node 14, such as latitude and longitude coordinates or the position of the destination with respect to the position of the source. The geographic location information is transmitted to source dispatcher 18 using a level three protocol. Source dispatcher 18 receives the geographic location information from destination dispatcher 20, and uses the location information to establish a network communication path between source POP node 12 and destination POP node 14.

Exemplary Embodiment for Establishing a Network Communication Path by Determining an Adjacent Intermediate Geographic Area in a Direction Toward a Destination Geographic Area In another exemplary embodiment, progressive extendable connectivity is used to establish a network communication path in a communication network between source POP node 12 and destination POP node 14. In establishing a network communication path, source POP node 12 determines a destination geographic area of destination POP node 14. If destination POP node 14 is located in a destination geographic area adjacent to the source geographic area where source POP node 12 is located, source POP node 12 connects to destination POP node 14. Else, source dispatcher 18 determines, based at least in part on the destination geographic area, an intermediate POP node 16 located in an intermediate geographic area that is adjacent to a source geographic area of source POP node 12 and is in a direction that is toward the destination geographic area.

Source dispatcher 18 may determine that there are two intermediate POP nodes 16, intermediate POP node 16g and intermediate POP node 16j, each located in an intermediate geographic area that is adjacent to a source geographic area of source POP node 12 and is in a direction that is toward the destination geographic area. Source dispatcher 18 may determine that intermediate POP node 16j is located south of source POP node 12 and that intermediate POP node 16g is located east of source POP node 12.

Source dispatcher 18 may also determine that intermediate POP node 16c is located in an intermediate geographic area that is adjacent to a source geographic area of source POP node 12. While intermediate POP node 16c is located in an intermediate geographic area that is adjacent to a source geographic area, intermediate POP node 16c is not located in an intermediate geographic area that is in a direction that is toward the destination geographic area. Therefore, source dispatcher 18 may decide that intermediate POP node 16c is not considered a candidate intermediate POP node 16.

Source dispatcher 18 may use a pseudo-random algorithm to choose an intermediate POP node 16 to connect to. A random or systematic algorithm may also be used. In this example, source POP node 12 establishes connectivity with intermediate POP node 16g, i.e., the pseudo-random algorithm selects intermediate POP node 16g. The algorithm may also consider other parameters, such as cost and quality of service parameters in order to determine which intermediate POP node 16 to connect to.

Intermediate POP node 16g determines whether it is destination POP node 14. If so, the destination has been reached. Else, intermediate POP node 16g determines whether the adjacent intermediate geographic area where intermediate POP node 16g is located is the destination geographic area. If so, intermediate POP node 16g connects to destination POP node 14 using a level two protocol. Otherwise, intermediate POP node 16g establishes intermediate POP node 16g as a current intermediate POP node and determines a next intermediate POP node 16 located in an intermediate geographic area that is adjacent to the intermediate geographic area of the current intermediate node, i.e., intermediate POP node 16g, and is in a direction that is toward the destination geographic area.

The following steps are repeated until destination POP node 14 is reached: (i) determining whether the intermediate POP node is destination POP node 14, and if not (ii) determining whether the adjacent intermediate geographic area where intermediate POP node 16 is located is the destination area, and if not, (iii) establishing intermediate POP node 16 as a current intermediate node and determining a next intermediate POP node 16 located in an intermediate geographic area that is adjacent to the intermediate geographic area of the current intermediate POP node 16 and is in a direction that is toward the destination geographic area.

In this exemplary embodiment, intermediate POP node 16g determines it is not destination POP node 14. Further, intermediate POP node 16g determines that the adjacent intermediate geographic area where it is located is not the destination geographic area. Therefore, intermediate POP node 16g establishes intermediate POP node 16g as a current intermediate POP node 16g and determines a next intermediate POP node 16h located in an intermediate geographic area that is adjacent to the intermediate geographic area of the current intermediate POP node 16g and in a direction toward the destination geographic area. Intermediate POP node 16g connects to intermediate POP node 16h using a layer two protocol.

Intermediate POP node 16h determines it is not destination POP node 14, so intermediate POP node 16h determines whether the adjacent intermediate geographic area where intermediate POP node 16h is located is the destination geographic area. This process continues until the determined intermediate node is destination POP node 14. Destination POP node 14 is located in an "intermediate geographic area" that is adjacent to the intermediate geographic area of the current intermediate POP node 16m. Further, the intermediate geographic area where destination POP node 14 is located is also in a direction toward the destination geographic area (south of the intermediate geographic area where 16m is located). In the last iteration of determining an intermediate geographic area, the "intermediate geographic area" may be the destination geographic area where destination POP node 14 is located. Intermediate POP node 16m connects to destination POP node 14 using a layer two protocol. The network communication bi-directional path between source POP node 12 and destination POP node 14 is finally established. A first network communication path between source POP node 12 and destination POP node 14 is established to include intermediate POP nodes 16g, 16h, 16i and 16m.

Alternatively, once intermediate POP node 16m determines that it is not destination POP node 14, intermediate POP node 16m may determine whether the destination geographic area is next to the intermediate geographic area where intermediate POP node 16m is located. Since the destination geographic area where intermediate POP node 16m is located is next to the destination geographic area where destination POP node 14 is located, intermediate POP node 16m connects to destination POP node 14 using a level two protocol.

Exemplary Embodiment for Establishing a Network Communication Path Based on Requisites of an Intermediate Node and a Predetermined Distance In another exemplary embodiment, progressive extendable connectivity is used to establish a network communication path between source POP node 12 and destination POP node 14, which is different than using a Dijkstra based routing protocol. In establishing a network path, source POP node 12 determines whether destination POP node 14 is located within a predetermined distance of source POP node 12. If destination POP node 14 is located within a predetermined distance of source POP node 12, source POP node 12 connects to destination POP node 14.

The determination as to whether the destination, e.g., destination POP node 14 is within a predetermined distance of the source, e.g., source POP node 12, may involve comparing a first location information associated with the destination, e.g., destination POP node 14, destination cloud 26, destination dispatcher 20 or destination node 28, with a second location information associated with a source, such as source POP node 12, source dispatcher 18, source node 24 or source cloud 22. For instance, first coordinates associated with destination POP node 14 may be compared to second coordinates associated with source POP node 12. The first coordinates may include latitude and longitude coordinates corresponding to the destination, and the second coordinates may include latitude and longitude coordinates corresponding to the source.

If the destination is located at a distance that is less than or equal to a predetermined distance, source POP node 12 connects to destination cloud 26 via destination POP node 14. Else, source POP node 12 determines an intermediate POP node 16 that meets certain source node to intermediate node requisites. The requisites may include, but are not limited to (i) ability to support the requirements of the tenant, (ii) geographic location that is closer to destination POP node 14 than the geographical location of the current node is (e.g. source node 24), and (iii) geographic location within a predetermined distance of the current node (e.g. source node 24).

When neither intermediate POP node 16g nor intermediate POP node 16j can support the requirements of the tenant, then source POP node 12 determines other intermediate POP nodes 16 located within a predetermined distance from source POP node 12 to connect to. In this example, intermediate POP node 16c is an alternative intermediate POP node 16 that source POP node 12 may connect to. Even though intermediate POP node 16c is within a predetermined distance from source POP node 12, intermediate POP node 16c is not closer to destination POP node 14 than source POP node 12 is. Nevertheless, given that intermediate POP node 16g and intermediate POP node 16j do not support the requirements of the tenant, source POP node 12 proceeds to connect to intermediate POP node 16c, regardless of the fact that intermediate POP node 16c may be farther from destination POP node 14 than source POP node 12 is, i.e., not in a direction toward destination POP node 14. In this example, however, intermediate POP node 16g does meet the requirements of the tenant. As such, source POP node 12 connects to intermediate POP node 16g, which is located in the path to destination POP node 14, i.e., is closer to destination POP node 14 than source POP node 12.

Intermediate POP node 16g determines whether it is destination POP node 14. If so, the destination has been reached. The determination as to whether intermediate POP node 16g is destination POP node 14 may involve comparing a first location information associated with destination POP node 14, destination cloud 26, destination dispatcher 20 or destination node 28, with a second location information associated with the intermediate dispatcher associated with intermediate POP node 16g or the node associated with the intermediate dispatcher making the determination, i.e., intermediate POP node 16g. For instance, first location information including first coordinates associated with destination POP node 14 may be compared to second location information including second coordinates associated with intermediate POP node 16g.

Else, intermediate POP node 16h determines whether destination POP node 14 is within a predetermined distance of intermediate POP node 16g. If so, intermediate POP node 16g connects to destination POP node 14 using a level two protocol. Else, intermediate POP node 16g proceeds to connect to a different intermediate POP node 16 that is located within a predetermined distance of intermediate POP node 16g and is closer to destination POP node 14 than intermediate POP node 16g is. The determination as to whether destination POP node 14 is located within a predetermined distance of the current intermediate POP node 16, and the connecting to a different intermediate POP node 16 that supports the requirements of the tenant when destination POP node 14 is not located within a predetermined distance of intermediate POP node 16, is repeated until destination POP node 14 is reached.

Intermediate POP node 16g determines that intermediate POP node 16h meets the intermediate node to intermediate node requisites. Intermediate POP node 16h supports the requirements of the tenant, is located within a predetermined distance of intermediate POP node 16g, and is closer to destination POP node 14 than intermediate POP node 16g is. Intermediate POP node 16g connects to intermediate POP node 16h using a layer two protocol. In another embodiment, a layer 3 protocol may be used to establish a connection between the nodes.

Intermediate POP node 16h connects to intermediate POP node 16i, and intermediate POP node 16i connects to intermediate POP node 16m. Intermediate POP node 16m determines that destination POP node 14 is within a predetermined distance of intermediate POP node 16m, so intermediate POP node 16m connects to destination POP node 14 using a level two protocol. Destination dispatcher 20 finally establishes bi-directional connectivity with source dispatcher 18 on the data path via a level two protocol. A first network communication path between source POP node 12 and destination POP node 14 includes intermediate POP nodes 16g, 16h, 16i and 16m.

Other paths from source POP node 12 to destination POP node 14 may include, for example, a second path that includes intermediate POP nodes 16g, 16k, 16l and 16p; a third path that includes intermediate POP nodes 16j, 16n, 16o and 16p; and a fourth path may include intermediate POP node 16j, 16k, 16o and 16p. Different paths may be calculated so that multi-equivalent solutions are available if there is congestion on one of the intermediate POP nodes. Source POP node 12 initiates a process of discovering a network communication path in a communication network to destination POP node 14. Each intermediate POP node 16 in the path discovers the path by determining the next intermediate POP node 16 to connect to. The provisioning time, i.e., the time it takes for source POP node 12 to connect to destination POP node 14 may be minutes. For example, the provisioning time for a source POP node 12 (located in Japan) to connect to an intermediate POP node 16 (located in Chicago) and then to a destination POP node 14 (located in Amsterdam) may be fifteen seconds. An on-demand provisioning time of minutes is an improvement over the current provisioning time, which may require a wait of a couple of months before establishing a dedicated connection with a peering cloud. An on-demand connection, because it is not a dedicated connection, may take less time to set up.

Data sent and received by each POP node may be encapsulated using a layer 2 protocol encapsulation, as opposed to a layer 3 protocol encapsulation. A layer three protocol in the Open Systems Interconnection model transmits data in the network layer. The network layer performs routing functions by routing packets according to a unique network node address, for example, an Internet Protocol address. These routable layer three addresses used by the network layer are in contrast to the layer-two addressed used by the data link layer, which do not identify a logical or physical group to which a node belongs to. Second level protocols use physical addressing, as opposed to logical addressing. The network connections between the POP nodes are achieved using level two protocol connections. No level three meshing is needed to connect the POP nodes, which allows the progressive extendable connectivity method to be independent of the different technologies that may be used to establish a connection, such as Ethernet over Optical, Multiprotocol Label Switching ("MPLS"), Virtual Private LAN Service ("VPLS"), Generic Routing Encapsulation ("GRE") Tunnel over Internet Protocol ("IP"), etc. For example, the path to destination POP node 14 is established without the need to examine an IP header. Establishing a connection from source POP node 12 to destination POP node 14 using a level three protocol may take considerable more time than if a level two protocol is used to establish the same connection, given that processing each layer three IP header at each intermediate POP node takes time, especially if multiple intermediate POP nodes are involved. The farther destination POP node 14 is from source POP node 12, the more intermediate POP nodes 16 will be involved in establishing a connection. Involving a large number of intermediate POP nodes 16, each determining routing by analyzing the layer three protocol headers of all the packets going through, may result in transmission delays. Also, any change in the topology of the network requires a topology update of the layer three routing tables, which takes time to propagate through all the POP nodes, causing even further delays.

Figure 4:
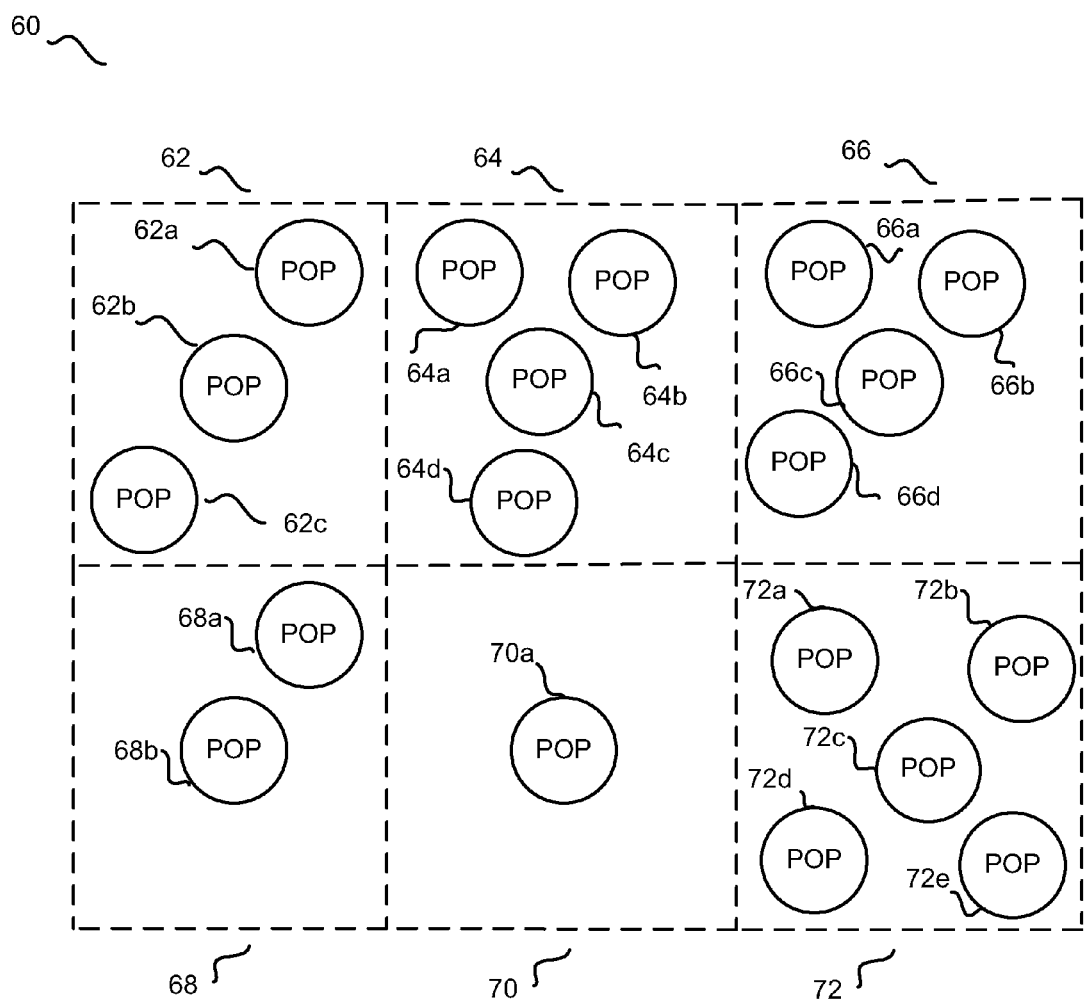
FIG. 4 is a block diagram of exemplary geographic areas including one or more nodes in accordance with the principles of the present invention.
Figure 4:
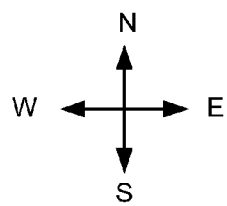

In another exemplary embodiment, source POP node 12, destination POP node 14 and intermediate/transient POP nodes 16c, 16d, 16e, 16f, 16g, 16h, 16i, 16j, 16k, 16l, 16m, 16n, 16o and 16p are part of a communication network having a plurality of substantially equal area geographic areas, i.e., the POP nodes may be located in a territory divided in different geographic areas. The different geographic areas include a source geographic area where source POP node 12 is located, a destination geographic area where destination POP node 14 is located, and different intermediate geographic areas where intermediate POP nodes 16c, 16d, 16e, 16f, 16g, 16h, 16i, 16j, 16k, 16l, 16m, 16n, 16o and 16p are located. One or more POP nodes may be positioned in each area. FIG. 4 is a block diagram of territory 60 covered by a communication network. Territory 60 includes source geographic area 62, intermediate geographic area 64, 68, 70 and 72, and destination geographic area 66. Each geographic area may have a length of 1000 km and a width of 1000 km.

Source geographic area 62 includes POP nodes 62a, 62b and 62c; intermediate geographic area 64 includes POP nodes 64a, 64b, 64c and 64d; destination geographic area 66 includes POP nodes 66a, 66b, 66c and 66d; intermediate geographic area 68 includes POP nodes 68a and 68b; intermediate geographic area 70 includes POP node 70a; and intermediate geographic area 72 includes POP nodes 72a, 72b, 72c, 72d and 72e. POP nodes 62a, 62b, 62c, 64a, 64b, 64c, 64d, 66a, 66b, 66c, 66d, 68a, 68b, 70a, 72a, 72b, 72c, 72d and 72e may be implemented using the above-described arrangement of node 32.

In an exemplary embodiment, POP node 62b may be a source POP node that requests a connection with POP node 66d, i.e., POP node 66d is the destination POP node. Source POP node 62b establishes communication with intermediate POP node 64c in intermediate geographic area 64. Alternatively, source POP node 62b, may connect to one of intermediate POP nodes 68a and 68b, that is located in an intermediate geographic area 68 adjacent to source geographic area 62 even if intermediate geographic area 68 is not in a direction that is toward the destination geographic area 66 when, for example, the intermediate POP nodes 64a-64d in intermediate geographic area 64 (which is in a direction toward the destination geographic area 66) are congested. For instance, a connection may go backward or in a direction that is not toward destination geographic area 66. Intermediate POP nodes 68a and 68b are not in a direction toward destination POP node 66d, as they are not east of source geographic area 62, but south of source geographic area 62. However, they are within a predetermined distance from source POP node 62b.

Intermediate POP node 68a connects to intermediate POP node 64d. Intermediate POP node 64d determines whether destination POP node 66d is within 1000 km of intermediate POP node 64d. Since destination POP node 66d is within 1000 km of intermediate POP node 64d, intermediate POP node 64d connects to destination POP node 66d. The established network communication path between source POP node 62b and destination POP node 66d includes intermediate POP node 68a and intermediate POP node 64d. The connections between path segments, i.e., the connection between nodes in a segment of the path, may be established upon identifying/discovering the next node to connect to. The connection may be established at that time, i.e., "instantaneously." Alternatively and as noted above, the connection between the nodes may be established by a service-level manager after all of the intermediate nodes that form a path between the source and destination have been identified.

Each POP node determines the next POP node to connect to based at least in part on the location of destination POP node 14, e.g., using the latitude and longitude coordinates of destination POP node 14. Limiting the granularity of each geographic area to a square of 1000 km length and 1000 km width limits the delay created when connecting to a POP node that is not closer to destination POP node 14, i.e., when the next POP node is not in a direction that is toward destination POP node 14. The delay will be negligible, as the delay will be limited to the time it takes a POP node to connect to another POP node that is no more than 1000 km away. In one embodiment, this delay is approximately six milliseconds for connecting optical nodes in optical networks. The optical node may include an optical interface that converts an electric signal to an optical signal, as the signals received at the node may be electrical signals.

Similarly, adding a new cloud to a consortium of clouds does not create a significant delay. Auto-pinning of new POP nodes involves determining in which geographic area the new POP node is located. As such, new clouds can be auto-pinned in a geographic area according to the location of the new cloud. The geographic areas may be arranged using a 1000 km granularity. For example, a new cloud may request to be part of a consortium. A geographical location, e.g., a latitude and longitude of the new POP node may be determined using different methods, such as using a global positioning service device. The new POP node is pinned into its appropriate geographic area, e.g., its appropriate 1000 km×1000 km area, based on its geographical location (latitude and longitude).

Figure 5:
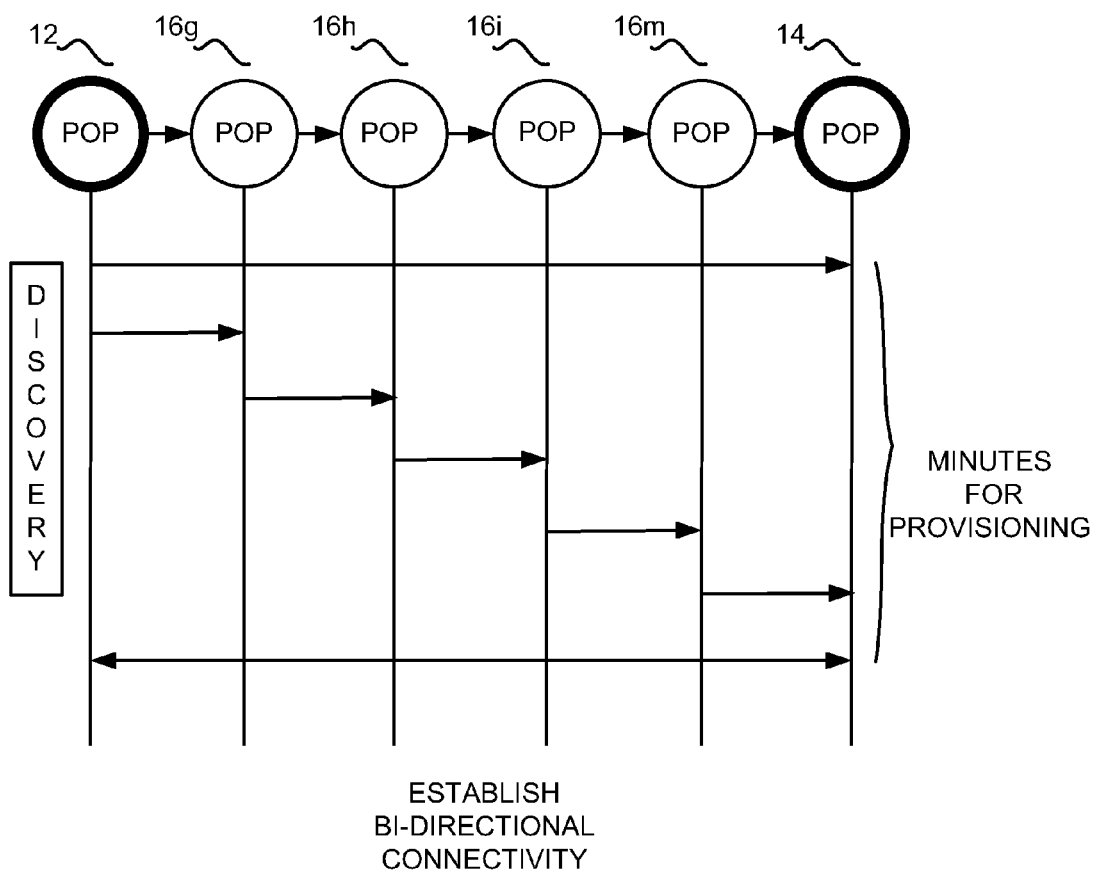
FIG. 5 is a block diagram of an exemplary network communication path between a source node and a destination node in accordance with the principles of the present invention.

FIG. 5 is a block diagram of an established network communication path between source POP node 12 and destination POP node 14. To establish a network communication path, source POP node 12 connects to intermediate POP node 16g. Intermediate POP node 16g connects to intermediate POP node 16h. Intermediate POP node 16h connects to intermediate POP node 16i. Intermediate POP node 16i connects to intermediate POP node 16m. Intermediate POP node 16m connects to destination POP node 14. Destination POP node 14 and source POP node 12 establish bi-directional connectivity. The connectivity may be established once all intermediate nodes 16 are identified and have accepted to support these connections, e.g., the intermediate nodes 16 have enough bandwidth for the connections. The intermediate POP nodes in this exemplary network communication path are intermediate POP nodes 16g, 16j, 16i and 16m.

The discovery time is the time it takes to discover a network communication path between source POP node 12 and destination POP node 14. The provisioning time, i.e., the time it takes to provision an on-demand connection between source POP node 12 and destination POP node 14, may be minutes. Using a logical inter-cloud dispatcher to establish and provision on-demand network communication paths may be more desirable than using full meshing, which is the current trend in cloud wide area network provisioning. At present, provisioning is effectuated with multiple links on a peer-to-peer basis, i.e., by establishing and provisioning as many broadband links between the tenant and the cloud servers as there are cloud accesses.

Establishing on-demand connections using the embodiments of the method of the present invention may alleviate a time-to-market for provisioning access broadband links between tenants and multi-cloud offerings. It may allow the establishment of a direct network communication path between source POP node 12 and destination POP node 14 without requiring mesh networking. Mesh networking is expensive due to the number of connections that must be established to route packets, regardless of whether there are demands to connect. Source POP node 12, instead of establishing dedicated connections to other clouds, identifies in the overall cloud offering available cloud accesses at a time of need. Allowing a requirement of a cloud to be fulfilled on-demand results in a reduced time-to-market. No dedicated connections between source POP node 12 and destination POP node 14 are needed, i.e., no full or partial meshing is necessary.

A logical inter-cloud layer two dispatcher peers logically to two POP nodes at a time to provide multi-cloud accesses. For example, intermediate dispatcher 30a (shown in FIG. 1) can peer logically to two dispatchers: source dispatcher 18 and intermediate dispatcher 30b. Intermediate dispatcher 30a establishes an incoming connection with source dispatcher 18; and an outgoing connection with intermediate dispatcher 30b. Peering to only two POP nodes at a time forces a linear path determination, as opposed to peering to more POP nodes, such as during meshing. Peering to only two nodes sets a boundary of how many peers each POP node can have per path discovery. The function of peering logically to two POP nodes at a time to provide on-demand multi-cloud accesses through a logical inter-cloud layer dispatcher may make it possible to avoid full meshed peering. Setting up connections on-demand may alleviate time-to-market delays and peering costs faced by the current mesh oriented solutions. The current multi-cloud solutions result in higher costs and a higher time-to-market due to the n-squared problem created by full-meshing between tenants and multi-clouds A short time to market can be achieved by using a fast fiber optic network to establish on-demand connections with POP nodes. The high transfer rate of a fiber optic network may create a real time experience for interactive applications.

Figure 6:
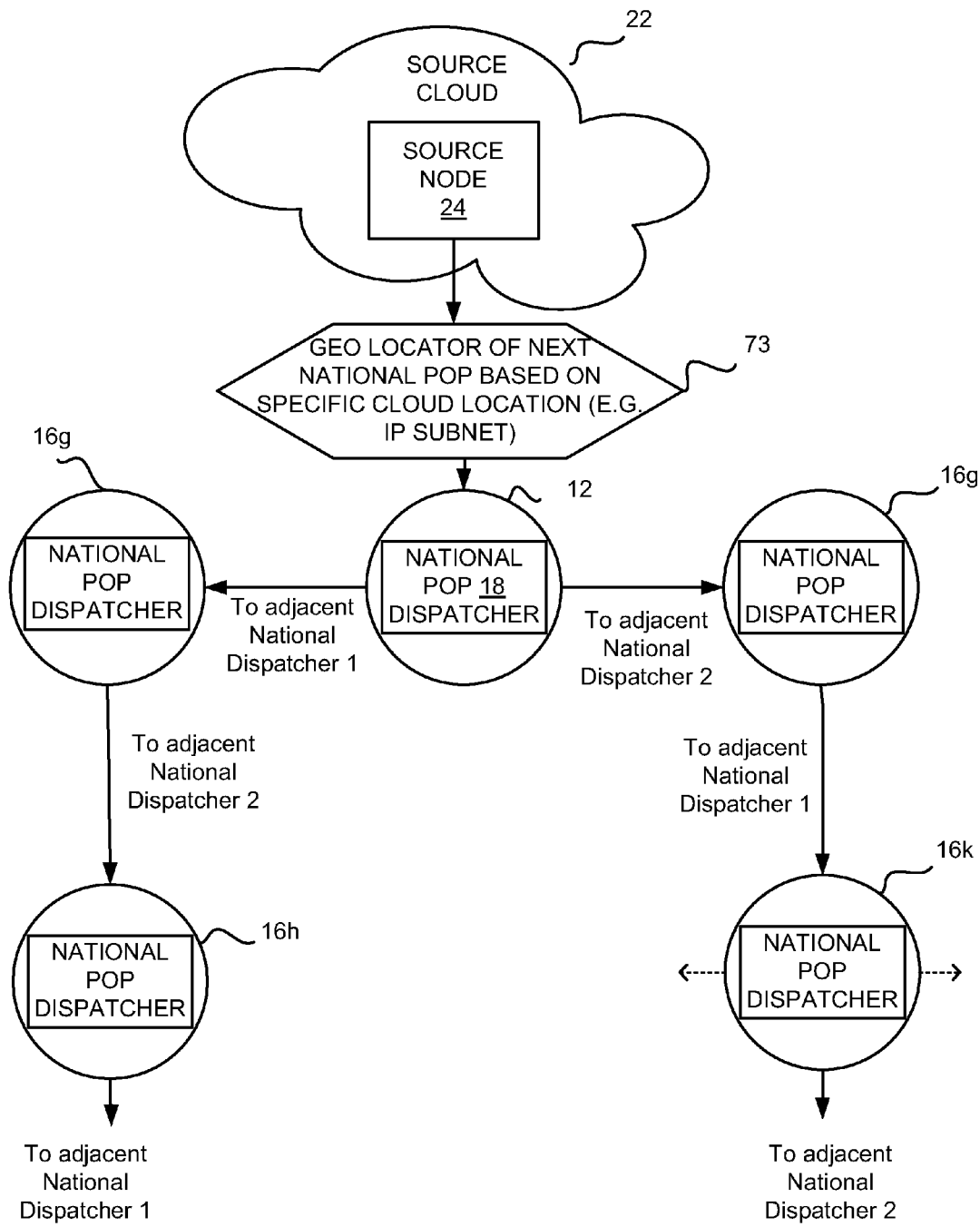
FIG. 6 is a block diagram of a communication flow between dispatchers in accordance with the principles of the present invention.

FIG. 6 is a block diagram of POP dispatchers peering logically to two POP nodes at substantially the same time to establish a network communication path between source POP node 12 and destination POP node 14. Source POP node 12, intermediate node 16g, intermediate node 16h and intermediate node 16k are each associated with a different POP dispatcher. Each of the POP dispatchers determines an on-demand connection to a POP node. Although only intermediate POP nodes 16g, 16h and 16k and their respective POP dispatchers are shown, the invention is not limited to such, as any number of intermediate POP nodes may be used to establish a network communication path.

In another exemplary embodiment, a POP dispatcher builds a path by selecting segments along the way and then using a Network Service Interface ("NSI") Application Program Interface ("API") for final set-up of the network communication path. A POP dispatcher locates the closest national intermediate POP node 16 to the destination POP node 14, with a minimum of peers. The connections to intermediate POP node 16 and destination POP node 14 are on-demand connections that do not require full mesh peering. Direct layer 2 networking is achieved, without using layer 3 encapsulation, so that no IP headers have to be processed to establish a connection. Decapsulation can be performed at the end cloud after the network path is established using layer two communications.

A tenant seeking a cloud to host application of the tenant can request on-demand connectivity to a multi-cloud offering. The tenant may want to establish a connection to the end cloud. The request for cloud access is handled on-demand, which reduces the time-to-market given that there is no need to establish full mesh peering to all clouds. As the cloud's tenant demands a connection, a logical POP dispatcher extends its peering in one of two possible ways to the targeted cloud. The request to connect to the intermediate clouds and the targeted cloud is made on a control path and the set-up provisioning is done on a data path. Once a connection is established, the POP nodes communicate on the data path.

An orientation of destination POP node 14 relative to source POP node 12 is determined. The orientation may have been determined as described above in FIGS. 3 and 4. Source POP node 12 proceeds to find a path that is generally oriented toward the destination geographic area where destination POP node 14 is located. The current national POP dispatcher associated with source POP node 12 evaluates its current location and compares its current location to the destination location. The destination location is evaluated against zero, minus or plus increments in longitude; and zero, minus and plus increments in latitude to determine how far away destination POP node 14 is from source POP node 12. The increments are based initially on the shortest distance between two points on the territory, i.e., the Earth. The destination location information and overall orientation of the destination location with respect to source POP node 12 is kept in the background.

In another exemplary embodiment, geographic areas may be arranged in predetermined increments. Source dispatcher 18 may determine an intermediate POP node 16 located in an adjacent intermediate geographic area at a predetermined distance increment from the source geographic area. For each increment, a determination is made as to whether the intermediate POP node 16 admits the request for access. For instance, intermediate POP node 16g may not have the right resources to accommodate the access request from source POP node 12.

Since intermediate POP node 16g can accommodate the access request, source POP node connects to intermediate POP node 16g. The dispatcher associated with intermediate POP node 16g determines that intermediate POP node 16h is a possible intermediate POP node 16 in the path to destination POP node 14. Using a control path, intermediate POP node 16g determines whether the adjacent dispatcher associated with intermediate POP node 16h can provide access to the specific wanted cloud, i.e., destination cloud 26. Intermediate POP node 16g is configured to connect and peer to two adjacent national dispatchers.

The national POP dispatcher associated with intermediate POP node 16g connects to two different adjacent national dispatchers: adjacent national source dispatcher 18 associated with source POP node 12 (incoming), and the adjacent national intermediate dispatcher associated with intermediate POP node 16h (outgoing). The intermediate dispatcher associated with intermediate POP node 16g peers logically to the two adjacent dispatchers. Alternatively, source POP node 12 may peer to intermediate POP node 16g. Intermediate POP node 16g may peer to both source POP node 12 (incoming) and intermediate POP node 16k (outgoing). As such, the dispatcher associated with intermediate POP node 16g locates the national intermediate POP node 16h closest to the specific targeted cloud with a minimum of peers to other dispatchers.

So, as the cloud tenant demands it, the logical dispatcher associated with intermediate POP node 16g extends its peering in only one of the two possible ways that can be taken to reach either the dispatcher associated with the destination POP node 14 in the targeted cloud or a dispatcher of an intermediate POP node, i.e., equivalent logical dispatchers that can be re-used by other tenants. A boundary on a total number of peers is set for the purpose of linear path discovery. More than one path is discovered in order to have a fallback path if needed, such as when there is a failure on one of the paths discovered. The peering in two possible ways is done for intermediate POP node 16g to: source POP node 12 and intermediate POP node 16k. The two per boundary is also for intermediate POP node 16g to: source POP node 12 and intermediate POP node 16h. Equivalent logical POP dispatchers can be re-used by other tenants at different level two wavelength λ POP nodes The wavelength is one way to provide isolation between tenants. The same POP node on different wavelengths for different tenants can be re-used.

In another exemplary embodiment, the national POP dispatcher, i.e., source dispatcher 18 associated with source POP node 12, may connect to geo-locator 73 to determine the location of the next national intermediate POP node based on the location of the specific cloud, i.e., destination cloud 26. Geo-locator 73 uses geographic location technology to determine a destination location. Source dispatcher 18 may also find the specific cloud location information from a global cloud registry maintained by a consortium of level two k POP nodes. Other methods can be used, in addition to using a geographic location or a main consortium registry, to obtain location information, such as a method that relies on subnet identifications.

Source dispatcher 18, may be a logical inter-cloud dispatcher configured to identify multi-cloud accesses available without requiring a full peering mesh to all cloud offerings. Unlike routing, no dedicated connections are necessary to make an access request to an end cloud. Multi-cloud accesses can be identified without using full mesh routing. An on-demand connection from source POP node 12 to destination POP node 14 can take minutes to establish. This is in contrast to a connection established by providing full meshing between all peering clouds, which may take months depending on the number of nodes involved and the number of routing tables that have to be created and updated for each node. In addition, a full mesh connection takes a significant amount of time to route using a level three protocol, as it entails looking-up routing information in a routing table at each and every node in the path. Each node then processes the routing information to determine the next hop.

Figure 7:
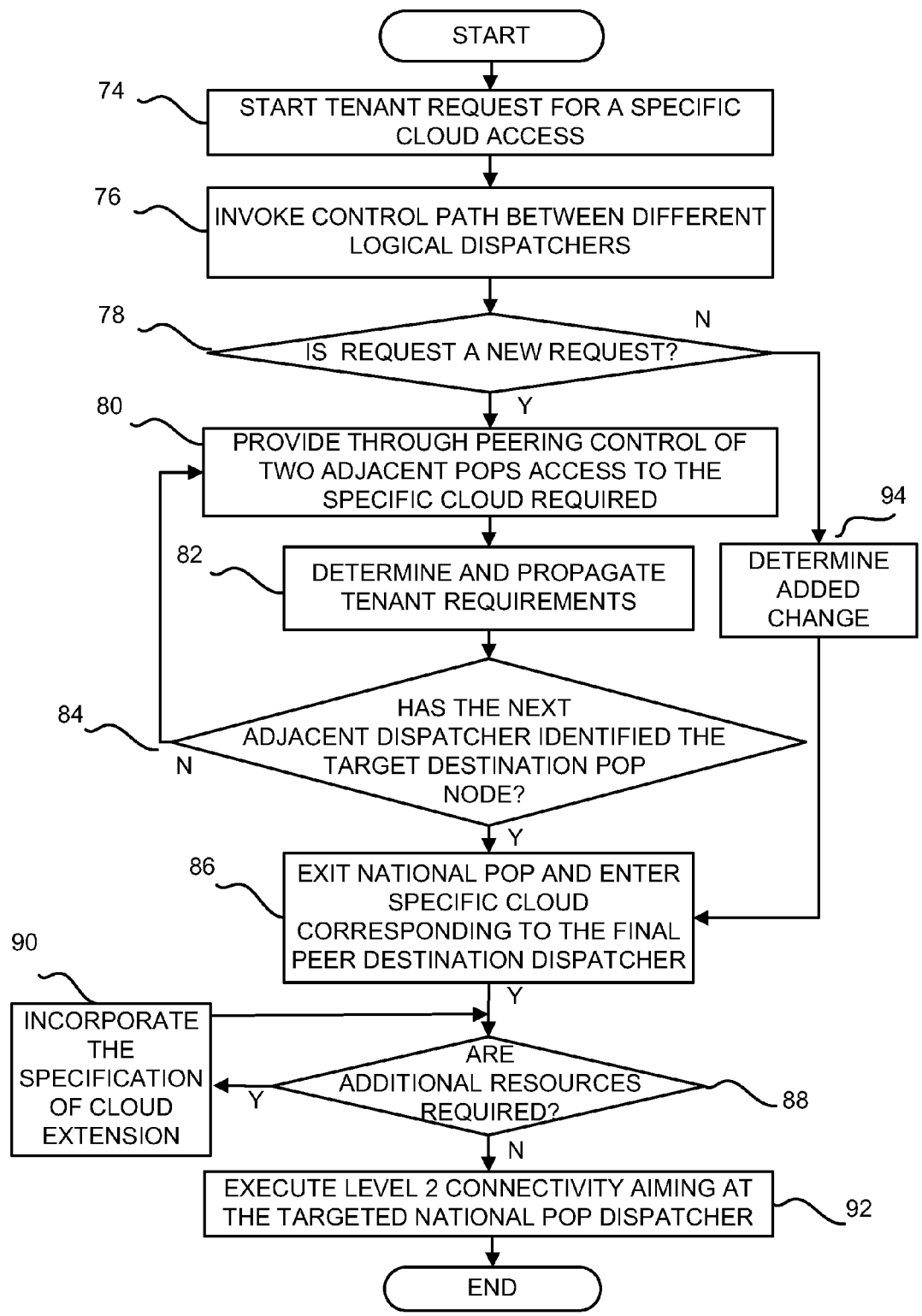
FIG. 7 is a flow chart of an exemplary process for establishing a network communication path between a source node and a destination node in accordance with the principles of the present invention.

An exemplary process for determining a network communication path between source POP node 12 and destination POP node 14 using progressive extendable connectivity is described with reference to FIG. 7. FIG. 7 shows how the step-by-step scaling of an adjacent/intermediate logical dispatcher leads to a full access of the specific targeted cloud, i.e., destination cloud 26. Source node 24 sends to source dispatcher 18 a request message requesting access to a specific cloud, i.e., destination cloud 26 (Block 74). A control path between different logical dispatchers is invoked (Block 76), e.g., between a logical dispatcher of the source cloud, i.e., source dispatcher 18, and a logical dispatcher of intermediate POP node 16g. This may force the process of path discovery to stick to linear path discovery as opposed to mesh path discovery. The intermediate dispatcher associated with intermediate POP node 16g determines whether the access request from source dispatcher 18 is a new request (Block 78), i.e., whether a new connection needs to be established or whether there is an existing connection already established between source dispatcher 18 and the intermediate dispatcher associated with intermediate POP node 16g.

If the request is not a new request, the intermediate dispatcher associated with intermediate POP node 16g determines what the added change (Block 94) to the already existing connection is. The tenant may add other requirements, such as more bandwidth, more storage, access to additional applications, etc. The tenant may renegotiate one or more requirements of the connection, such as the length of the connection, requiring an increase of the existing 24 hour connection to a 36 hour connection.

If the intermediate dispatcher associated with intermediate POP node 16g determines that the request is a new access request, then it provides access to the specific cloud required, i.e., destination cloud 26, through peering control of two adjacent POPs, i.e., source POP node 12 and intermediate POP node 16h (the two adjacent POPs to intermediate POP node 16g are source POP node 12 and intermediate POP node 16h, which form a boundary that forces a linear path discovery as opposed to a mesh path discovery) (Block 80).

The intermediate dispatcher of intermediate POP node 16g provides, through peering control, a control path connection request or a connection with source dispatcher 18. Source dispatcher 18 determines and initiates the propagation of the tenant's requirements to the targeted cloud, i.e., destination cloud 26, by propagating the requirements to the intermediate dispatcher associated with intermediate POP node 16g (Block 82). The tenant requirements are relayed afterwards by the intermediate node dispatcher associated with intermediate POP node 16g to the intermediate node dispatcher associated with intermediate POP node 16h, and the same relayed by the intermediate dispatcher associated with intermediate POP node 16h, etc., until the requirements are relayed to destination dispatcher 20. Requirements may include bandwidth requirements in gigabytes per second, round-trip-time requirements specified in milliseconds, preferred time-to-market requirements specified in minutes, etc.

Source dispatcher 18 determines whether intermediate POP node 16g has been identified to the service management level as the target destination POP node 14 (Block 84). If the dispatcher of the adjacent cloud, i.e., the intermediate dispatcher of intermediate POP node 16g, provides access to the specific destination cloud 26, i.e., to the cloud associated with intermediate dispatcher 16g (intermediate POP node 16g has been identified as the final destination POP node 14), then source dispatcher 18 connects to the cloud associated with intermediate POP node 16g, which could have been identified as destination cloud 26 (the cloud associated with intermediate POP node 16g is destination cloud 26) (Block 86). Given that the intermediate dispatcher of intermediate POP node 16g does not provide access to the specific destination cloud 26, (the intermediate dispatcher associated with intermediate POP node 16g has not been identified as the target destination POP node 14), source dispatcher 18 finds another adjacent POP, i.e., another intermediate POP node 16 to send a request for access (Block 80). The steps described in Blocks 76-84 are repeated until the final destination cloud 26 is reached. Re-iterations end once intermediate POP node 16h, intermediate POP node 16i, intermediate POP node 16m and destination POP node 14 have been discovered and destination POP node 14 meets the test of Block 84, which is to provide access to the specific destination cloud 26. Once that is achieved, Block 86 invokes that the path discovery includes exiting destination POP node 14 and entering of destination cloud 26 where destination node 28 resides.

When source POP node 12 connects to intermediate POP node 16g, i.e., intermediate POP node 16g is destination POP node 14, destination dispatcher 20 of destination POP node 14 determines whether additional resources are required by the source cloud, i.e., by source cloud 22 (Block 88). Additional resources may include, for example, cloud bursting to a public Internet and cloud spanning, among others. Cloud bursting includes the dynamic deployment of a software application that runs on internal computer resources of one cloud to another cloud in order to address a rise in demand. Cloud bursting refers to expanding the application to an external cloud, such as the public Internet, to handle temporary demands. Cloud Spanning includes running an application in a way that its components straddle multiple cloud environments which could be any combination of internal, private, external and public clouds. Cloud spanning refers to the situation where the application components are continuously distributed across multiple clouds. Other additional resource requirements may include, for example, a request to use clean energy, among other additional resource requirements.

If no additional resources are required by source cloud 22, then source dispatcher 18 requests or establishes a level two bi-directional connection with the target destination national POP dispatcher, i.e., destination dispatcher 20 (Block 92). Else, source dispatcher 18 incorporates in messages to the national dispatcher, i.e., to destination dispatcher 20, the specifications of cloud extension (cloud bursting and spanning) (Block 90). The destination dispatcher 20 associated with destination POP node 14 processes the additional requirements to meet the service level agreement. Of note, source dispatcher 18 may include information on the additional requirements in the first message sent through the intermediate dispatchers.

Figure 8:
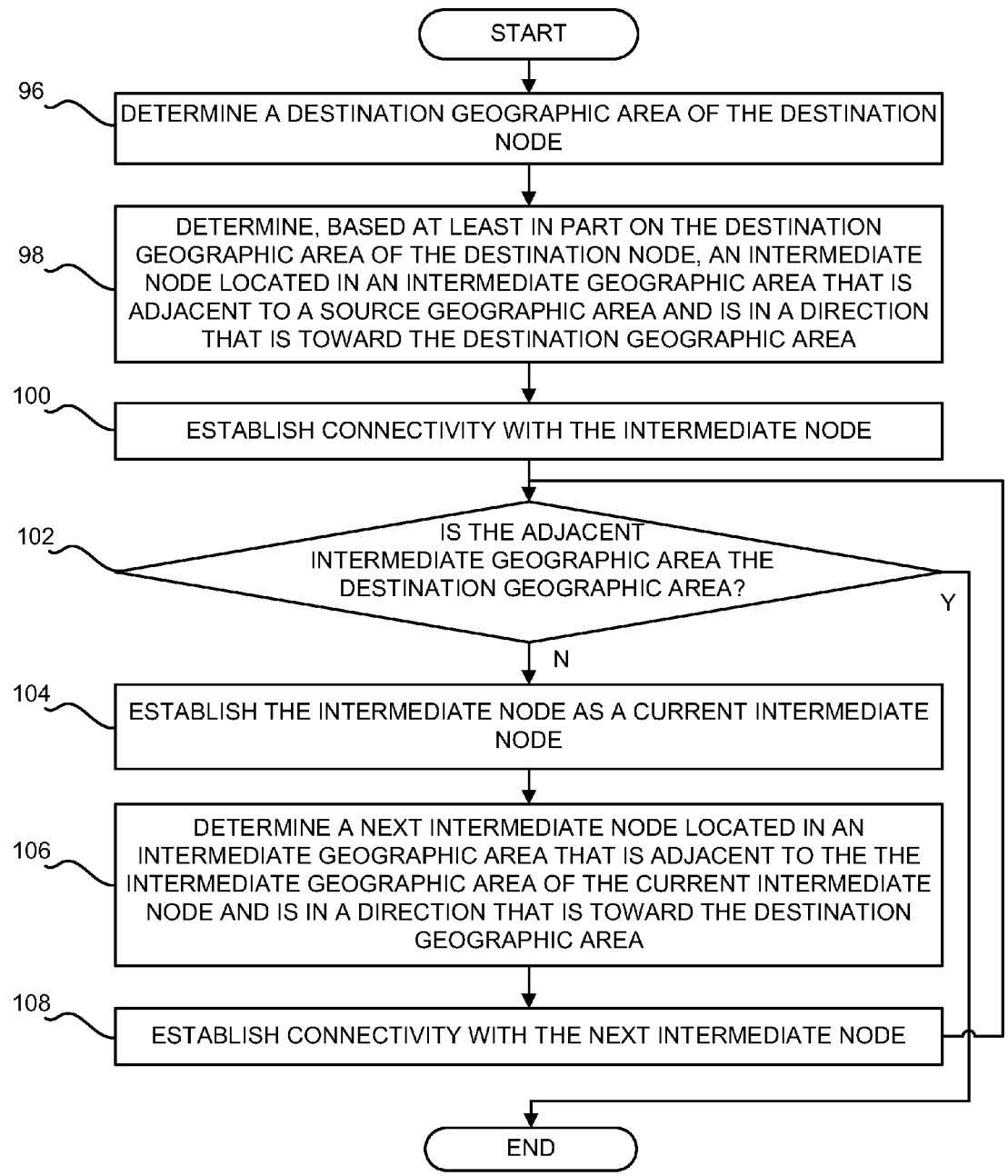
FIG. 8 is a flow chart of another exemplary process for establishing a network communication path between a source node and a destination node in accordance with the principles of the present invention.

An exemplary process for establishing a network communication path in a communication network between a source node and a destination node, the communication network having multiple substantially equal area geographic areas is described with reference to FIG. 8. A destination geographic area of the destination node is determined (Block 96). An intermediate node located in an intermediate geographic area that is adjacent to a source geographic area of the source node and is in a direction that is toward the destination geographic area is determined based at least in part on the destination geographic area (Block 98). Connectivity with the intermediate node is established (Block 100 The intermediate node may determine whether it has the resources or not. If it has the resource, the intermediate node is identified to the service management layer as an "ok" node to connect to. A determination is made as to whether the adjacent intermediate geographic area is the destination geographic area (Block 102). If the adjacent intermediate geographic area is the destination geographic area, the process ends, as the destination area has been reached. Else, if the determined adjacent intermediate geographic area is not the destination geographic area, the intermediate node is established as a current intermediate node (Block 104). A next intermediate node located in an intermediate geographic area that is adjacent to the intermediate geographic area of the current intermediate node and is in a direction that is toward the destination geographic area is determined (Block 106). Connectivity with the next intermediate node is established (Block 108). After all intermediate and destination nodes are identified, the destination node establishes a bi-directional path between itself and the source node via the intermediate nodes discovered. As such, at least two different embodiments are possible. In the first embodiment, the path establishment connection may be done per segment, i.e., the connection to each intermediate node may be established after discovery of the intermediate node. In the second embodiment, the connection to each intermediate node may be established after all of the intermediate nodes have been identified. After all nodes in the path are discovered, a service level manager that is part of a management system may establish the full bi-directional path.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a point of sale terminal, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for establishing at least part of a network communication path, in a communication network, from a source node to a destination node, the source node being associated with a source dispatcher and the destination node being associated with a destination dispatcher, the communication network having a plurality of geographic areas, the method comprising:
   (a) transmitting a connectivity request to the destination dispatcher from the source dispatcher using a data link layer of an Open Systems Interconnection (OSI) model;
   (b) receiving from the destination dispatcher location information associated with the destination node,
   (c) determining a destination geographic area of the destination node;
   (d) determining, based at least in part on the destination geographic area relative to a source geographic area of the source node, at least one intermediate node located in at least one intermediate geographic area that is adjacent to the source geographic area of the source node and is in a direction that is toward the destination geographic area, the determining of the at least one intermediate node includes analyzing the location information associated with the destination node;
   e(1) in response to determining at least two intermediate nodes in step (d), selecting one of the at least two intermediate nodes to add to the communication path;
   e(2) in response to determining one intermediate node in step (d), selecting the intermediate node to add to the communication path; and
   (f) establishing connectivity with the selected intermediate node using a data link layer of an Open Systems Interconnection (OSI) model;
   (g) determining whether the selected intermediate node is the destination node based at least in part on the location information.

2. The method of claim 1, further comprising:
   (h) in response to determining that the selected intermediate node is not the destination node, determining whether the intermediate geographic area associated with the selected intermediate node is the destination geographic area;
   (i) in response to determining that the intermediate geographic area associated with the selected intermediate node is not the destination geographic area, establishing the selected intermediate node as a current intermediate node;
      (i)(1) determining, based at least in part on the destination geographic area relative to the intermediate geographic area, at least one intermediate node located in at least one intermediate geographic area that is adjacent to geographic area of the current intermediate node and is in a direction that is toward the destination geographic area;
      (i(2)) in response to determining at least two intermediate nodes in step (i(1)), selecting one of the at least two intermediate nodes to add to the communication path;
      (i(3)) in response to determining one intermediate node in step (i(1)), selecting the intermediate node to add to the communication path; and
      (i(4)) establishing connectivity with the selected intermediate node; and
   (j) repeating steps (h) and (i) until the intermediate geographic area associated with the selected intermediate node is the destination geographic area.

3. The method of claim 1, wherein, the selected intermediate node is associated with an intermediate dispatcher, and the selecting of the intermediate node includes:
  transmitting a connectivity requirement of the source node to the intermediate dispatcher from the source dispatcher using a data link layer of an Open Systems Interconnection (OSI) model;
  determining whether the intermediate node supports the connectivity requirement of the source node; and
  when the intermediate node is unable to support the connectivity requirement of the source node:
    selecting a different intermediate node in the intermediate geographic area that supports the connectivity requirement of the source node; and
    establishing connectivity with the different intermediate node.

4. The method of claim 1, wherein a connection between the source node and the destination node is not a dedicated connection.

5. The method of claim 1, further comprising identifying the destination node using at least one of geo-location, a subnet identification and a registry number associated with the destination node.

6. The method of claim 1, wherein the adding of the selected intermediate node to the communication path includes determining whether the intermediate geographic area of the selected intermediate node is the destination geographic area.

7. A source dispatcher for communication with a source node, the source dispatcher arranged to establish at least part of a network communication path from the source node to a destination node in a communication network, the destination node being associated with a destination dispatcher, the communication network having a plurality of geographic areas, the source dispatcher comprising:
  a transmitter, the transmitter configured to transmit a connectivity request to the destination dispatcher using a data link layer of an Open Systems Interconnection (OSI) model;
  a receiver, the receiver configured to:
    receive from the destination dispatcher location information associated with the destination node; and
    receive a request from the source node to connect to the destination node; and
  a processor, the processor in communication with the receiver, the processor configured to:
    determine a destination geographic area of the destination node;
    determine, based at least in part on the destination geographic area relative to a source geographic area of the source node, at least one intermediate node located in at least one intermediate geographic area that is adjacent to the source geographic area of the source node and is in a direction that is toward the destination geographic area, the determining of the at least one intermediate node further includes analyzing the location information associated with the destination node;
    in response to determining at least two intermediate nodes based at least in part on the destination geographic area, select one of the at least two intermediate nodes to add to the network communication path;
    in response to determining one intermediate node based at least in part on the destination geographic area, select the intermediate node to add to the network communication path;
    establish connectivity with the intermediate node using a data link layer of an Open Systems Interconnection (OSI) model; and
    determine whether the selected intermediate node is the destination node based at least in part on the location information.

8. The source dispatcher of claim 7, wherein each one of the plurality of geographic areas has a length of less than 1,000 kilometers and a width less than 1,000 kilometers.

9. The source dispatcher of claim 7, wherein the selected intermediate node is associated with an intermediate dispatcher;
  the transmitter being further configured to transmit a connectivity requirement of the source node to the intermediate dispatcher using a data link layer two protocol;
  the processor, in the selecting of the intermediate node, being further configured to:
    determine whether the intermediate node supports the connectivity requirement of the source node; and
    when the intermediate node is unable to support the connectivity requirement of the source node, select a different intermediate node in the intermediate geographic area that supports the connectivity requirement of the source node and establish connectivity with the different intermediate node.

10. The source dispatcher of claim 7, wherein the processor is further configured to identify the destination node using at least one of geo-location, a subnet identification and a registry number associated with the destination node.

11. A source node, the source node configured to establish at least a part of a network communication path in a communication network from the source node to a destination node the communication network having a plurality of geographic areas, the destination node is associated with a destination dispatcher, the source node comprising:
  a transmitter, the transmitter configured to transmit a connectivity request to the destination dispatcher using a data link layer of an Open Systems Interconnection (OSI) model;
  a receiver, the receiver configured to receive from the destination dispatcher location information associated with the destination node;
  a processor; and
  a memory containing instructions that, when executed by the processor, configure the processor to:
    determine a destination geographic area of the destination node;
    determine, based at least in part on the destination geographic area relative to a source geographic area of the source node, at least one intermediate node located in at least one intermediate geographic area that is adjacent to the source geographic area of the source node and is in a direction that is toward the destination geographic area, the determining of the at least one intermediate node includes analyzing the location information associated with the destination node;
    in response to determining at least two intermediate nodes based at least in part on the destination geographic area, select one of the at least two intermediate nodes to add to the network communication path;
    in response to determining one intermediate node based at least in part on the destination geographic area, select the intermediate node to add to the network communication path;
    establish connectivity with the selected intermediate node using a data link layer of an Open Systems Interconnection (OSI) model; and determine whether the selected intermediate node is the destination node based at least in part on the location information.

12. The source node of claim 11, wherein each one of the plurality of geographic areas has a length less than 1,000 kilometers and a width less than 1,000 kilometers.

13. The source node of claim 11, wherein the selected intermediate node is associated with an intermediate dispatcher;
the transmitter being further configured to transmit a connectivity requirement of the source node to the intermediate dispatcher using a data link layer of an Open Systems Interconnection (OSI) model;
the memory containing further instructions that, when executed by the processor, configure the processor, in the selecting of the intermediate node, to:
determine whether the intermediate node supports the connectivity requirement of the source node; and
when the intermediate node is unable to support the connectivity requirement of the source node, select a different intermediate node in the intermediate geographic area that supports the connectivity requirement of the source node and establish connectivity with the different intermediate node.

14. The source node of claim 11, wherein the memory contains further instructions that, when executed by the processor, configure the processor to identify the destination node using at least one of geo-location, a subnet identification and a registry number associated with the destination node.

15. The source node of claim 11, wherein the processor determines the destination geographic area by using at least in part the location information.

16. A method for establishing a network communication path in a communication network between a source node and a destination node, the source node being associated with a source dispatcher and the destination node being associated with a destination dispatcher, the communication network having a plurality of geographic areas, the method comprising:
(a) transmitting a connectivity request to the destination dispatcher from the source dispatcher using a data link layer of an Open Systems Interconnection (OSI) model;
(b) receiving from the destination dispatcher location information associated with the destination node;
(c) determining a destination geographic area of the destination node;
(d) determining, based at least in part on the destination geographic area relative to a source geographic area of the source node, at least one intermediate node located in at least one intermediate geographic area that is adjacent to the source geographic area of the source node and is in a direction that is toward the destination geographic area, the determining of the at least one intermediate node includes analyzing the location information associated with the destination node;
e(1) in response to determining at least two intermediate nodes in step (d), selecting one of the at least two intermediate nodes to add to the network communication path, the selection being made by a network element other than the intermediate node being added to the network communication path;
(e(2)) in response to determining one intermediate node in step (d), selecting the intermediate node to add to the network communication path, the selection being made by a network element other than the intermediate node being added to the network communication path;
(f) establishing connectivity with the selected intermediate node using a data link layer of an Open Systems Interconnection (OSI) model;
(g) determining whether the selected intermediate node is the destination node based at least in part on the location information;
(h) determining whether the intermediate geographic area associated with the selected intermediate node is the destination geographic area;
(i) if the determined intermediate geographic area associated with the selected intermediate node is not the destination geographic area:
establishing the selected intermediate node as a current intermediate node;
selecting a next intermediate node located in an intermediate geographic area that is adjacent to the intermediate geographic area of the current intermediate node and is in a direction that is toward the destination geographic area;
(j) repeating steps (h) and (i) until the intermediate geographic area associated with the selected intermediate node is the destination geographic area;
(k) determining the network communication path; and
(l) establishing communication from the source node and the destination node using the determined network communication path.

\* \* \* \* \*